(12) United States Patent
Kim

(10) Patent No.: US 8,733,512 B2
(45) Date of Patent: May 27, 2014

(54) ELECTRIC DISC BRAKE

(75) Inventor: Jin Seok Kim, Gyeonggi-do (KR)

(73) Assignee: Mando Corporation, Pyeongtaek-Si (KR)

( * ) Notice: Subject to any disclaimer, the term of this patent is extended or adjusted under 35 U.S.C. 154(b) by 54 days.

(21) Appl. No.: 13/106,599

(22) Filed: May 12, 2011

(65) Prior Publication Data

US 2011/0278107 A1 Nov. 17, 2011

(30) Foreign Application Priority Data

May 12, 2010 (KR) .......................... 10-2010-0044221

(51) Int. Cl.
*F16D 55/22* (2006.01)
*F16D 65/21* (2006.01)

(52) U.S. Cl.
USPC ....... 188/72.1; 188/18 A; 188/72.4; 188/72.7; 188/72.8; 188/106 F; 188/138; 188/156; 188/162; 188/181 T; 188/196 P; 60/581; 60/589; 60/592; 303/3; 303/20; 303/113.1; 303/113.3; 303/113.4; 303/114.1; 303/115.1; 303/115.2

(58) Field of Classification Search
USPC ................................. 188/72.1, 71.8
IPC ....................................... F16D 55/22
See application file for complete search history.

(56) References Cited

U.S. PATENT DOCUMENTS

| | | | | |
|---|---|---|---|---|
| 4,031,986 | A | * | 6/1977 | Thompson ................... 188/72.4 |
| 5,632,362 | A | * | 5/1997 | Leitner ......................... 188/344 |
| 6,056,090 | A | * | 5/2000 | Reimann et al. ............. 188/72.1 |
| 6,554,109 | B1 | * | 4/2003 | Olschewski et al. ......... 188/72.8 |
| 6,691,837 | B1 | * | 2/2004 | Kapaan et al. ................ 188/72.1 |
| 6,907,967 | B1 | * | 6/2005 | Kapaan et al. ................ 188/162 |
| 2003/0102192 | A1 | * | 6/2003 | Kapaan ........................ 188/72.7 |

FOREIGN PATENT DOCUMENTS

KR 10-0233639 B1 9/1999

OTHER PUBLICATIONS

Chinese Office Action issued in Chinese Patent Application No. CN 201110121253.0 dated Mar. 5, 2013.
Chinese Office Action for Chinese Patent Application No. 201110121253.0 mailed Oct. 21, 2013, 7 pages.

* cited by examiner

*Primary Examiner* — Robert A Siconolfi
*Assistant Examiner* — San Aung
(74) *Attorney, Agent, or Firm* — McDermott Will & Emery LLP

(57) ABSTRACT

Disclosed is an electric disc brake capable of reducing noise and vibration while expanding the life span of the product. The electric disc brake includes a caliper housing to press friction pads provided at both sides of a disc against the disc, a cylinder installed in the caliper housing, a piston moving back and forth in the cylinder to press the friction pads, a driving device generating driving force with respect to the piston, and a volume compensation part communicated with the cylinder to compensate for an increment of a volume of the cylinder according to movement of the piston.

7 Claims, 2 Drawing Sheets

ELECTRIC DISC BRAKE

This application claims the benefit of Korean Patent Application No. 10-2010-0044221 filed on May 12, 2010, in the Korean Intellectual Property Office, the disclosure of which is incorporated herein by reference.

BACKGROUND

1. Field

The disclosure relates to an electric disc brake. More particularly, the disclosure relates to an electric disc brake capable of compensating for volume variation in a cylinder caused by the movement of a piston.

2. Description of the Related Art

Different from a typical hydraulic disc brake, an electric disc brake employs a motor, which is operated by electricity, as a driving source for a driving unit that presses friction pads.

The electric disc brake according to the related art includes a disc rotating together with wheels of a vehicle, first and second friction pads arranged at both sides of the disc to press the disc, a pressing member moving back and forth to press the first and second friction pads, a motor generating a driving force, and a reduction unit amplifying the driving force of the motor to transfer the amplified driving force to the pressing member.

The reduction unit used in the electric disc brake according to the related art can be mainly classified into a parallel-axis type reduction unit and a coaxial reduction unit according to the arrangement between a motor shaft and the reduction unit.

In general, the parallel-axis type reduction unit includes an input-side gear coupled with an output shaft of a motor and an output-side gear engaged with the input-side gear and coupled with a screw connected to a pressing member.

However, the parallel-axis type reduction unit represents problems in that the gear connection structure is complicated, and the working friction occurs. Thus, if grease is boiled due to overheat of the brake, the parallel-axis type reduction unit may be broken by high pressure.

SUMMARY

Accordingly, it is an aspect of the disclosure to provide an electric disc brake capable of expanding the life span of a product by lowering the working friction of the product.

It is another aspect of the disclosure to provide an electric disc brake, in which grease is always filled even if a volume of a friction part, that is, a volume of a spindle inside a caliper is changed.

Additional aspects and/or advantages of the disclosure will be set forth in part in the description which follows and, in part, will be apparent from the description, or may be learned by practice of the disclosure.

The foregoing and/or other aspects of the disclosure are achieved by providing an electric disc brake comprising a caliper housing to press friction pads provided at both sides of a disc against the disc, a cylinder installed in the caliper housing, a piston moving back and forth in the cylinder to press the friction pads, a driving device generating driving force with respect to the piston, and a volume compensation part communicated with the cylinder to compensate for an increment of a volume of the cylinder according to movement of the piston, wherein the volume compensation part is configured to vary an effective area filled with grease according to internal pressure of the cylinder communicated with the volume compensation part.

According to the disclosure, the volume compensation part comprises: a chamber filled with the grease; a connection part to connect the chamber with the cylinder such that the chamber is communicated with the cylinder; an elastic member installed in the chamber; and a support plate provided at an end of the elastic member and elastically supported by the elastic member.

According to the disclosure, the driving device includes a screw moving back and forth to press one of the friction pads and formed on an inner surface thereof with a thread, a spindle having a thread coupled with the thread of the screw, a rotating shaft connected to the spindle, and a motor for rotating the rotating shaft.

According to the disclosure, the caliper housing has a body, the cylinder is provided in the body of the caliper housing, and a bearing is installed in the body of the caliper housing to support the rotating shaft and the spindle while making contact with the rotating shaft.

As described above, according to the electric disc brake of the disclosure, friction of the working part is reduced, so that noise and vibration can be reduced and the life span of the product can be lengthened.

In addition, grease is always filled even when the volume of the friction part is changed, so that the explosion or the breakage of the electric disc brake can be prevented even if the grease is boiled due to overheat of the brake.

BRIEF DESCRIPTION OF THE DRAWINGS

These and/or other aspects and advantages of the disclosure will become apparent and more readily appreciated from the following description of the embodiments, taken in conjunction with the accompanying drawings of which.

DETAILED DESCRIPTION OF THE EXEMPLARY EMBODIMENTS

Figure 1:
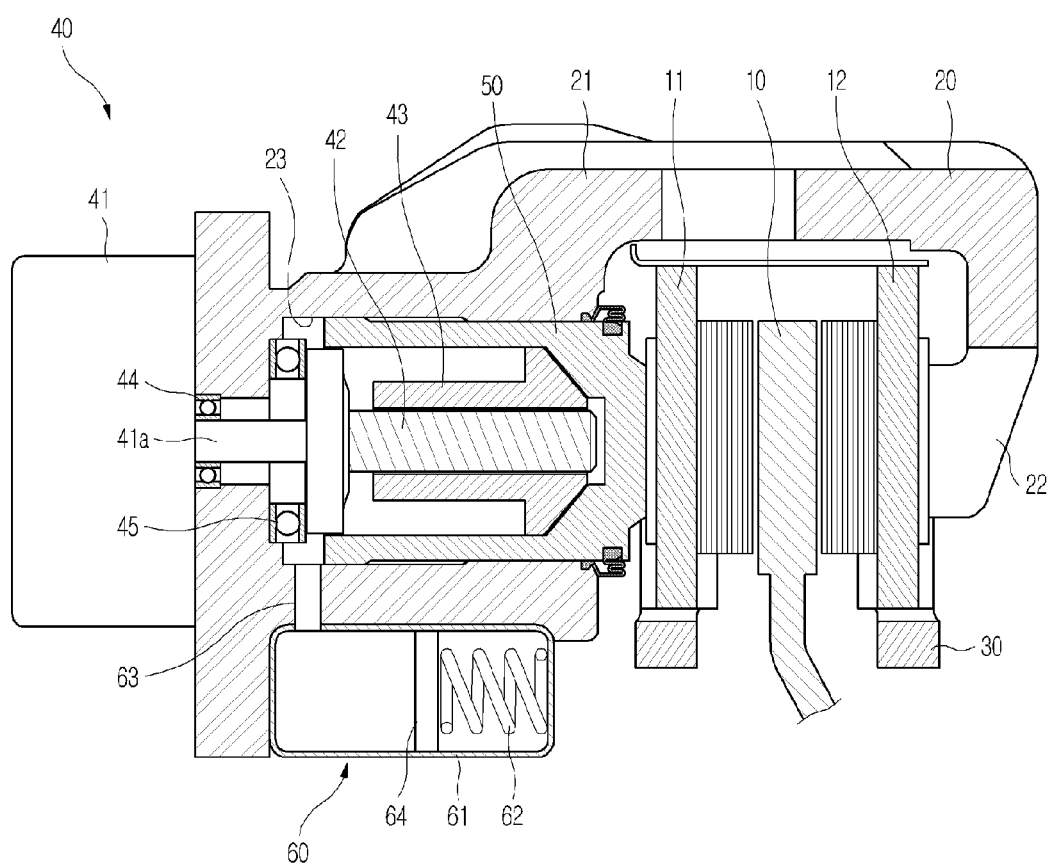
FIG. 1 is a sectional view schematically showing an electric disc brake according to the disclosure.

Reference will now be made in detail to the embodiments of the disclosure, examples of which are illustrated in the accompanying drawings, wherein like reference numerals refer to the like elements. The embodiments are described below to explain the disclosure by referring to the figures.

Figure 2:
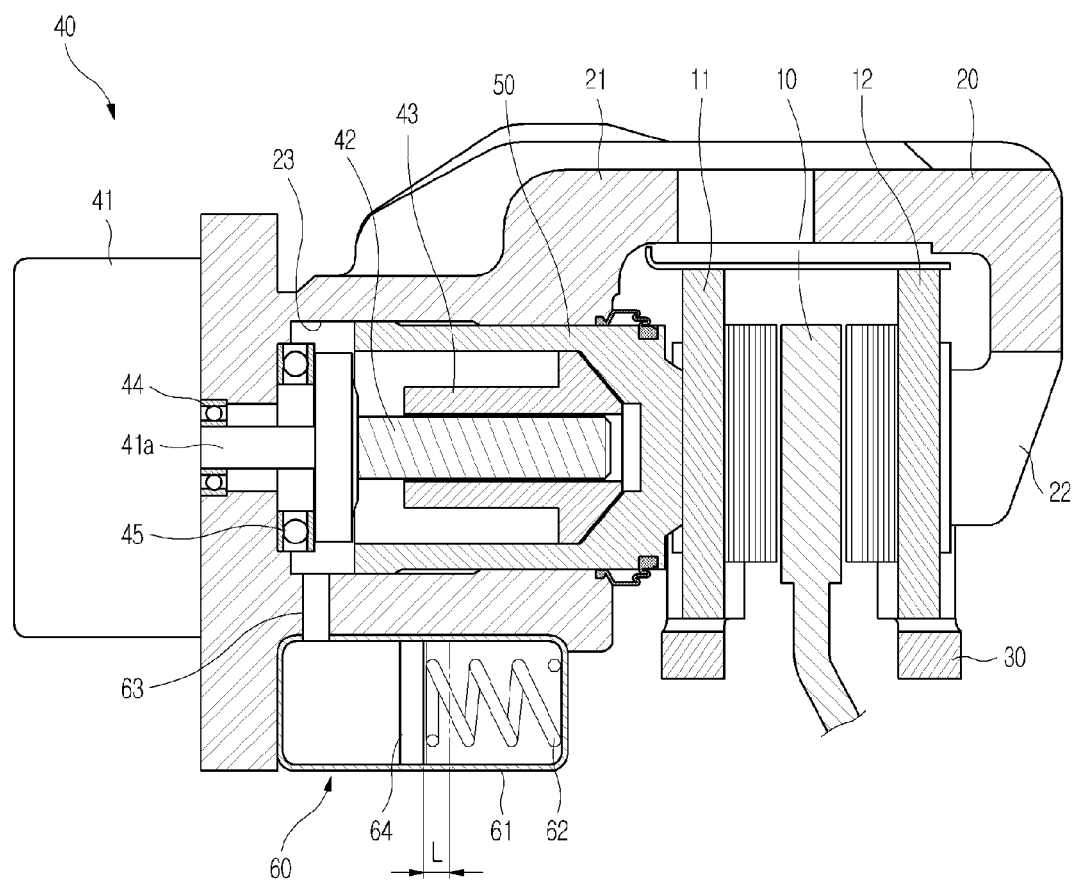
FIG. 2 is a sectional view schematically showing the operation of a volume compensation part employed in an electric disc brake according to the disclosure.

FIG. 1 is a sectional view schematically showing an electric disc brake according to the disclosure, and FIG. 2 is a sectional view schematically showing the operation of a volume compensation part employed in the electric disc brake according to the disclosure.

As shown in FIG. 1, the disc brake according to the disclosure includes a disc 10 rotating together with wheels of a vehicle, first and second friction pads 11 and 12 disposed at both sides of the disc 10 to perform the braking operation by pressing both lateral sides of the disc 10, a caliper housing 20 for pressing the first and second friction pads 11 and 12, and a driving device 40 installed in the caliper housing 20 for the purpose of the braking operation.

The first and second friction pads 11 and 12 is supported by a carrier 30 fixed to a vehicle body such that the first and second friction pads 11 and 12 can move closely to or away from both lateral sides of the disc 10, and the caliper housing 20 is supported by the carrier 30 such that the caliper housing 20 can move back and forth to press or release the first and second friction pads 11 and 12.

The caliper housing 20 includes a body 21 having a cylinder 23 therein and a finger part 22 slantingly extending from the body 21 to the second friction pad 12 to support a rear surface of the second friction pad 12.

In addition, the driving device 40 is installed on the body 21 of the caliper housing 20 to press the first friction pad 11.

The driving device 40 includes a piston 50 moving back and forth in the body 21 of the caliper housing 20 to press or release the first friction pad 11, a screw 43 for pressing the piston 50 to allow the piston 50 to move back and forth, a spindle 42 formed on an outer peripheral surface thereof with a thread (not shown) coupled with a thread (not shown) formed on an inner surface of the screw 43, and a motor 41 to rotate the spindle 42 in the forward or reverse direction.

The spindle 42 is connected to the motor 41 through a rotating shaft 41a.

The piston 50 is installed in the cylinder 23 such that the piston 50 can move back and forth without being rotated.

In addition, first and second bearings 44 and 45 are provided in the cylinder 23 to support the rotating shaft 41a and the spindle 42.

If the motor 41 is driven for the purpose of the braking operation, the rotating shaft 41a and the spindle 42 are rotated by the rotational force of the motor 41, so the screw 43, which is screw-coupled with the spindle 42, presses the piston 50. Thus, the piston 50 moves toward the first friction pad 11 and the caliper housing 20 moves in opposition to the piston 50, so that the finger part 22 presses the second friction pad 12 against the disc 10, thereby braking the wheels.

According to the embodiment of the disclosure, a volume compensation part 60 is provided to compensate for the volume of the cylinder 23 when the piston 50 moves out of the cylinder 23.

The volume compensation part 60 includes a hollow chamber 61, a connection part 63 to connect the hollow chamber 61 to the cylinder 23 such that the hollow chamber 61 is communicated with the cylinder 23, an elastic member 62 provided at one inner side of the hollow chamber 61, and a support plate 64 provided at the other end of the elastic member 62.

The support plate 64 divides the hollow chamber 61 into two parts, in which the elastic member 62 is provided in one of the two parts and grease is filled in the other of the two parts. The part filled with the grease is communicated with the cylinder 23 through the connection part 63.

The support plate 64 compresses the elastic member 62 or moves by the elastic force of the elastic member 62 according to the variation of the internal pressure of the chamber 61. At this time, the variation of the internal pressure of the chamber 61 may depend on the variation of the volume of the cylinder 23. In detail, since the support plate 64 is moved in the chamber 61 together with the elastic member 62 according to the pressure variation in the cylinder 23, an effective area filled with the grease is varied. Thus, even if the grease is boiled due to overheat of the brake, the overheated grease is discharged to the chamber 61 when the pressure exceeds a predetermined level, so the volume of the chamber 61 is changed, thereby preventing the explosion or breakage of the electric disc brake.

Due to the volume compensation part 60 having the above structure, the grease can be easily supplied to the cylinder 23. Since the grease can be easily supplied to the screw coupling part between the spindle 42 and the screw 43 installed in the cylinder 23, the working friction between spindle 42 and the screw 43 can be reduced so that the wear-resistant property can be improved.

That is, as the friction pads are worn, the piston 50 may protrude due to the rotation of the spindle 42 and the support plate 64 is moved corresponding to the increment L of the volume of the cylinder 23 by the elastic member 62 that applies predetermined pressure in the chamber 61 even if the volume of the cylinder 23 is increased, so that the grease in the chamber 61 is filled in the cylinder 23. In other words, even if the volume of the cylinder 23 is changed, the volume compensation part 60 compensates for the volume of the cylinder 23 by using the elastic member 62 and the support plated 64.

Although few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. An electric disc brake, comprising:
   a caliper housing to press friction pads provided at both sides of a disc against the disc;
   a cylinder disposed in the caliper housing;
   a piston moving back and forth in the cylinder to press the friction pads;
   a driving device generating a driving force with respect to the piston; and
   a volume compensation part non-selectively communicating with the cylinder to compensate for an increment of a volume of the cylinder according to movement of the piston,
   wherein the volume compensation part is configured to automatically vary an effective area filled with grease according to an internal pressure of the cylinder communicating with the volume compensation part.

2. The electric disc brake of claim 1, wherein the volume compensation part comprises:
   a chamber filled with the grease;
   a connection part connecting the chamber with the cylinder such that the chamber communicates with the cylinder;
   an elastic member disposed in the chamber; and
   a support plate provided at an end of the elastic member and elastically supported by the elastic member.

3. The electric disc brake of claim 1, wherein the driving device includes:
   a screw moving back and forth to press one of the friction pads and disposed on an inner surface thereof with a thread,
   a spindle having a thread coupled with the thread of the screw,
   a rotating shaft connected to the spindle, and
   a motor for rotating the rotating shaft.

4. The electric disc brake of claim 3, wherein:
   the caliper housing has a body,
   the cylinder is provided in the body of the caliper housing, and
   a bearing is disposed in the body of the caliper housing to support the rotating shaft and the spindle while making contact with the rotating shaft.

5. The electric disc brake of claim 1, wherein:
   the volume compensation part has a volume, and
   the volume compensation part changes the volume thereof to compensate for the increment of the volume of the cylinder according to movement of the piston.

6. The electric disc brake of claim 1, wherein the volume compensation part compensates for the increment of the volume of the cylinder, when the piston moves out of the cylinder.

7. The electric disc brake of claim 1, wherein the volume compensation part includes a support plate which moves within the volume compensation part to change the volume thereof.

* * * * *